United States Patent [19]
Mettig et al.

[11] 3,734,071
[45] May 22, 1973

[54] V-TYPE RECIPROCABLE PISTON INTERNAL COMBUSTION ENGINE

[75] Inventors: Hermann Mettig, Rodenkirchen; Bernhard Medenus, Bensberg-Lustheide, both of Germany

[73] Assignee: Klockner-Humboldt-Deutz Aktiengesellschaft, Cologne-Deutz, Germany

[22] Filed: Aug. 10, 1970

[21] Appl. No.: 62,560

[52] U.S. Cl..............................123/55 V, 123/90.27
[51] Int. Cl.................................................F02b 75/22
[58] Field of Search...................123/90.27, 55, 55 V, 123/139 AT, 139 BF

[56] References Cited
UNITED STATES PATENTS 2,040,847   5/1936   Hesselman......................123/195 A
2,654,355   10/1953  Scheiterlein....................123/55 R X
3,400,695   9/1968   Zaruba............................123/55 R X

FOREIGN PATENTS OR APPLICATIONS 573,807   12/1945   Great Britain.....................123/55 R

*Primary Examiner*—William E. Wayner
*Attorney*—Walter Becker

[57] ABSTRACT

A V-type reciprocating piston internal combustion engine with valves in the cylinder heads, especially a supercharged engine, having exhaust and air supply conduits and valve actuating devices all located within the lateral limits of the engine as determined by the outer limits of the cylinder heads and the rods of the valves therein.

4 Claims, 3 Drawing Figures

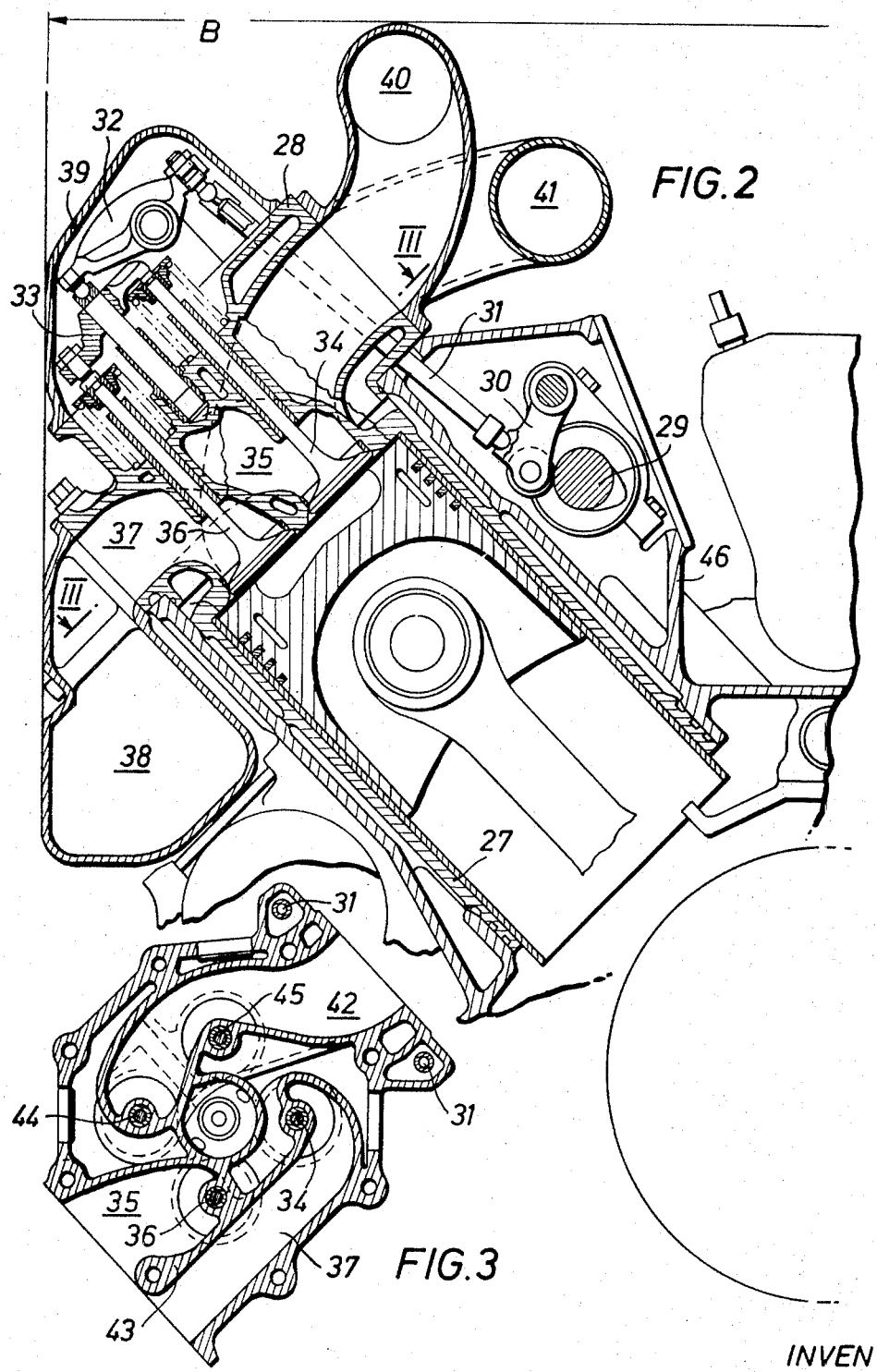

V-TYPE RECIPROCABLE PISTON INTERNAL COMBUSTION ENGINE

The present invention relates to a V-type reciprocable piston internal combustion engine, particularly supercharged reciprocable piston internal combustion engine, in which the collecting pipes for the gas change are arranged between the rows of cylinders and in which alongside the outer sides of the cylinder rows there are arranged the injection pump with governor and one cam shaft each with the valve actuating elements which through the intervention of pushrods, yokes and rockers actuate the valves.

The limited space conditions in motor vehicles, especially railway vehicles, special vehicles, or ships, make a compact design of the driving engines mandatory. A particularly compact construction in this connection is an internal combustion engine with V-shaped arrangement of the cylinders. With such a design, the auxiliary machines and accessories, such as filters and coolers, are preferably so arranged between the rows of cylinders and/or on the outside of the rows of cylinders that they will not protrude beyond the maximum width of the structure as it is determined by the cylinder heads. With supercharged internal combustion engines, the turbocharger with the collecting lines for the charging air and the exhaust takes up considerable space so that its connection to the internal combustion engine causes many problems if the compact installation space of the engine is locally not materially to be exceeded. In this connection it is particularly difficult with supercharged internal combustion engines to arrange the grouped exhaust gas conduits. With V-engines, the structural width is determined primarily by the fork angle which the rows of cylinders form with each other, and consequently by the structural elements mounted on and upon the cylinder heads. Similarly, the structural width may be determined by the air intake pipes or exhaust gas pipes when they are arranged on the outside of the cylinder rows.

A supercharged internal combustion engine has become known in which the collecting lines for the gas change are arranged between the cylinder rows and the cam shafts with the valve actuating elements are located on the outside of the cylinder rows. Furthermore, with this engine, the injection pumps are arranged on the outer side of the cylinders within the largest building width of the engine which largest building width is determined by the pushrod with the valve actuating elements and by the housing surrounding the same. In this connection it is disadvantageous that the pushrods which extend upwardly on the outside of the cylinder head increase the building width of the internal combustion engine.

There has furthermore become known an internal combustion engine in which the cam shafts are arranged between the cylinder rows, and the collecting pipes for the charging air extend along the outside of the cylinders and are located within the greatest building width of the internal combustion engine. This design has the drawback that the building width of the internal combustion engine, due to the design of the cylinder heads, exceeds the width of the structure as it is determined by the location of the valves with their actuating elements.

It is, therefore, an object of the present invention to reduce the building width of the engine to a minimum by a suitable arrangement of the elements or units to be connected thereto and of the auxiliary machines as well as by the design of the cylinder head and the control means.

This object and other objects and advantages of the invention will appear more clearly from the following specification in connection with the accompanying drawings, in which:

FIG. 1 diagrammatically illustrates a reciprocable piston internal combustion engine of the V-type according to the invention and, more specifically, shows a cross-section through the longitudinal central axis of two cylinders of said engine according to which the cam shafts are journalled on the outside of the cylinder rows.

FIG. 2 is a section through the longitudinal central axis of the cylinder unit of a V-type internal combustion engine in which the cam shaft or cam shafts is or are journalled within the V-shaped space.

FIG. 3 is a section through the cylinder head taken along the line III—III of FIG. 2.

Figure 1:
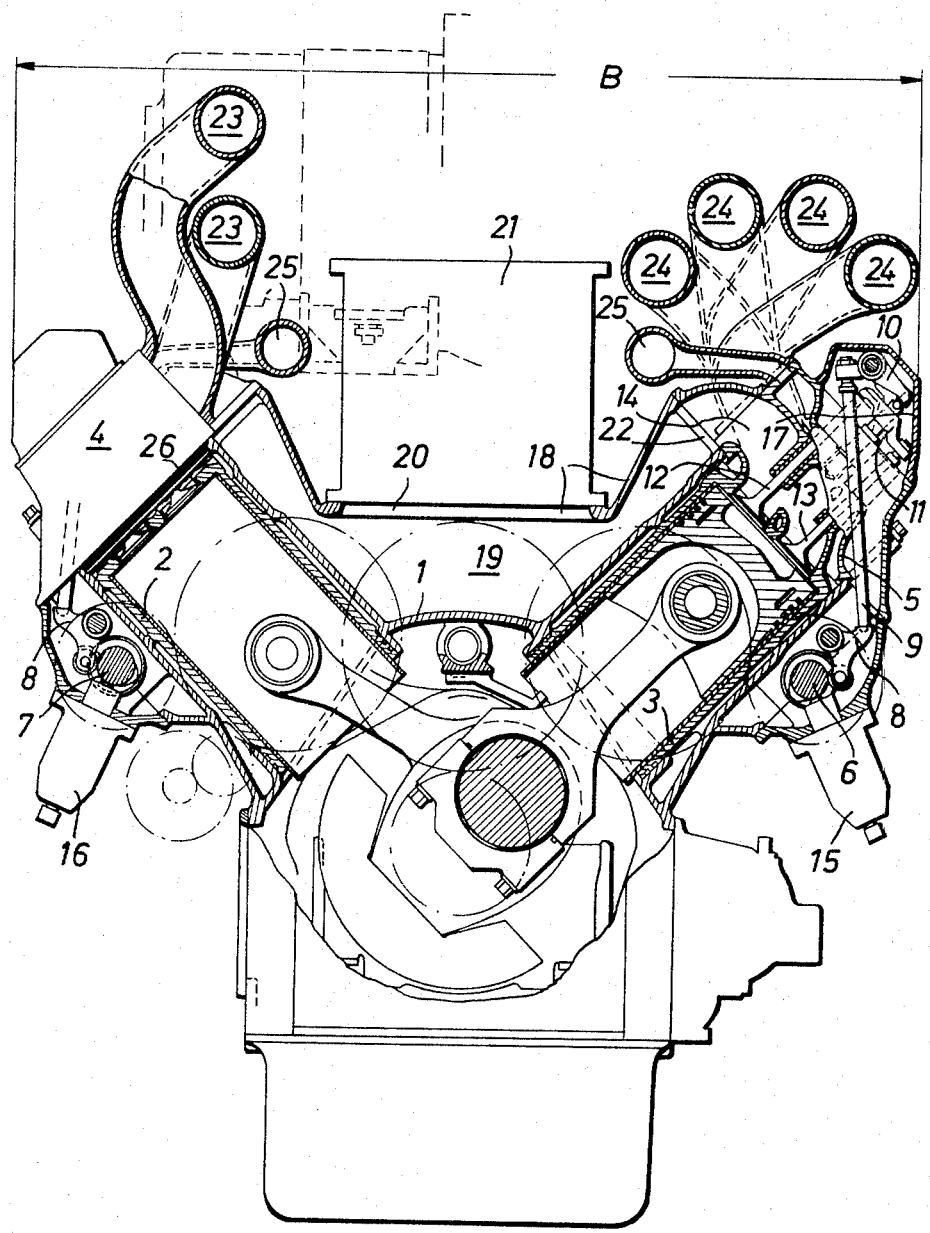

The internal combustion engine according to the present invention is characterized primarily in that the pushrods are so inclined with regard to the cylinder center that they are located within the contours of the cylinder head which determine the building width of the engine, said cylinder head comprising the valves and the driving elements therefor. The individual injection pumps driven by the cam shaft are likewise arranged within the largest building width of the engine The pushrods which are inclined toward the cylinder center are advantageously driven by angle levers. This makes possible the journalling of the cam shafts below the cylinder heads to such an extent that the cam shafts will be located within the building width of the internal combustion engine. The gas change passages which are each controlled by two valves lead from the combustion chamber to the inside of the cylinder rows. In this way, at the start of the passage at the outside of the cylinder, there is obtained a cross-section for the passage of the gas quantity of a single valve which cross-section increases correspondingly within the range of the second valve located toward the inner side of the cylinders. This narrow cross-section of the passage which is rather flat at the start, will result in a low building height for the cylinder head on the outside with shorter valves than on the inner side of the cylinder row. The operation of the differently long valves in pairs is effected by a cranked yoke whereby simultaneously the building width of the V-engine is reduced by the housing surrounding the control means for the valves.

According to a further development of the invention, it is suggested that the collecting pipe line for the charging air is formed by the engine housing between the cylinder rows and a housing wall which is arranged thereabove and comprises connecting surfaces and openings for the exhaust gas turbocharger, the charged air cooler and the individual inlet passages and cylinder heads. Such a design has the advantage that the charging air conduit takes good advantage of the space between the cylinder rows which spaces is full of crevices and protrusions. Furthermore, the charging air conduit can be designed with a large volume so that the pressure pulsations will remain low. In view of the particular design of the connecting openings in the upper housing wall of the charging air accumulator, the costs for the connection of the parts which are operatively connected to the charging air accumulator, for instance of the charging air blower, of the charging air cooler and of the cylinder heads, will be rather low.

Similarly, the problem involved will be solved with a reciprocable internal combustion engine of the V-type, especially supercharged engine, in which the exhaust gas collecting lines are arranged between the cylinder rows while the charging air collecting lines are arranged on the outside of the cylinder rows, and in which the gas change is controlled by valves which are operated in pairs by one or two cam shafts while the cam shafts are arranged between the cylinders. More specifically, the solution of this problem according to the invention consists in that inlet and outlet valves are arranged in planes transverse to the longitudinal axis of the engine, and the valves associated with the outside of the cylinder rows are shorter than the valves associated with the inner side of the cylinder rows. The shorter valves on the outer side of the engine will together with two parallel inlet passages result in a low building height for the cylinder head.

According to a further feature of the invention, it is suggested to control the differently long valves in pairs through the intervention of a cranked yoke while simultaneously the largest building width of the V-engine will be determined by the housing surrounding the actuating means for the valves.

Finally, it is suggested so to design the charging air collecting pipes that they are located within the maximum width of the V-engine as determined by the cylinder head with valve operation.

Referring now to the drawings in detail, the arrangement shown in FIG. 1 comprises a machine housing 1 with cylinders 2 and 3 and cylinder heads 4 and 5 in upright arrangement. Inlet valves 12 and 13 are controlled by cam shafts 6 and 7 mounted on the outside of the cylinders and acting upon said valves through angle levers 8, pushrod 9, rocker 10, and yoke 11. Both valves 12 and 13 control the inlet passage 14. Simultaneously, the cam shafts 6 and 7 control injection pumps 15 and 16. The shorter valve 12 together with the crank yoke 11 and the rocker 10, and the housing 17 surrounding the same determine the outer contour of the cylinder head which simultaneously determines the maximum building width B of the internal combustion engine. The pushrod 19 is inclined toward the cylinder axis to such an extent that those located within these parts form the outer contour of the cylinder head 4, 5.

That part of the housing 1 of the internal combustion engine which is located between the cylinder rows forms together with a superimposed second housing wall 18 the collecting chamber 19 for the charging air, said second housing wall 18 being located approximately at half the height of the cylinders 2, 3. Laterally, the housing wall 18 forming the charging air collecting chamber 19, extends approximately parallel to the cylinder rows and upwardly to the height of the cylinder head supporting surface 26 while within the range of a cylinder 2, 3 being equipped with one or two flange openings 22. These flange openings 22 in the plane of the cylinder head supporting surface 26 is covered by the cylinder head 4, 5 and corresponds to the charging air passage thereof. Through the intervention of a further flange opening 20 in the housing wall 18 which is arranged approximately in the center between the cylinder rows 2 and 3, the charging air cooler 21 is directly connected to the charging air collecting chamber 19. In a similar manner after charging air cooler chamber 21, the waste gas turbo-loader, not shown in the drawings, may be built up directly on the housing wall 18 of the charging air collecting chamber 19. The connection with the charging air cooler 21 may be effected by a pipe line or through a flange opening by the double wall design of the housing wall 18 between the two units. In view of this specific design of the charging air collecting chamber 19, the otherwise customary and bulky pipe lines becomes superfluous and the large volume charging air collecting chamber 19 results in a reduced pressure pulsation relative to pipe lines while less sealing areas and sufficiently free space will be available for the connection of the charging air cooler and the waste gas conduit bundles during the shock charging. The waste gas conduit bundles 23 and 24 are on the left-hand machine side (with regard to the drawing) illustrated for an eight and twelve cylinder engine and on the right-hand side are illustrated for a sixteen cylinder engine. They are likewise located within the given building width B as determined by the cylinder heads. Similarly, between the cylinder rows and below the waste gas conduits 23 and 24 there are provided the cooling water collecting lines 25.

FIG. 2 shows a portion of a machine housing 46 with cylinders 27 and cylinder head 28 in upright condition. Two cam shafts 29 mounted between the cylinder rows (only one being shown), actuate inlet valves 34 and 36 through rockers 30, pushrods 31, rockers 32, and a yoke 33. Valves 34 and 36 control an inlet passage 35 and 37 each of which in parallel arrangement start from a charging air collecting line 38 passing by the outside of the cylinder row. The shorter valve 36 together with the crank yoke 33 and lever or rocker 32 and the housing surrounding the same determines the outer contour of the cylinder head which simultaneously determines the maximum building width B of the internal combustion engine. The charging air collecting line 38 is located within this maximum building width. The waste gas conduits 40 and 41 are passed along the inner side of the cylinder rows in conformity with the shock charge in a bundled manner.

According to FIG. 3, the two inlet passages 35 and 37 separated by a partition 43 are in a parallel arrangement passed to the outside of the cylinder row. The two passages may, if desired, also be designed without the partition 43 so as to form a single wide passage. An outlet passage 42 controlled by two valves 44 and 45 of different lengths and in series arrangement leads to the inner side of the cylinder row. The shape of the outlet passage is, in view of a short cylinder distance, and in view of the necessary pushrod guiding means on both sides, arranged relatively high with regard to the inlet passages which for obtaining a low building height of the cylinder head are located in parallel arrangement or merge in a relatively wide passage.

It is, of course, to be understood that the present invention is, by no means, limited to the particular designs shown in the drawings, but also comprises any modifications within the scope of the appended claims.

What is claimed is:

1. In combination with a V-type reciprocating piston internal combustion engine especially narrowly constructed as determined by valve means: a crankcase, two rows of cylinders extending upwardly from said crankcase at an angle to each other and having cylinder heads at the upper ends, valve means in said cylinder heads having rod means extending outwardly from said cylinder heads, pushrod means for actuating said valve means, a cam shaft adjacent each row of cylinders, lever means operatively connecting one end of each pushrod means with the adjacent cam shaft, rocker means operatively connecting the other end of each pushrod means with the rod means of the respective valve means, and injection pump means adjacent each cam shaft and driven thereby, said injection pump means and pushrod means, said lever means and said rocker means all being disposed inwardly from laterally spaced vertical planes defining the maximum width of said engine at the cylinder heads.

2. An engine in combination according to claim 1 in which said lever means are angle levers pivotally supported adjacent said cam shaft.

3. An engine in combination according to claim 1 in which said pushrod means are generally vertical and are at the outer sides of the respective cylinders, and air supply passage means between said rows of cylinders and extending to said cylinder heads, said valve means including a pair of valves in each cylinder head adapted when open to connect said passage means with the respective cylinder, each said pair of valves being in side by side relation in the lateral direction of the engine, the rod on the outermost one of each pair of valves being shorter than the rod on the other thereof, and a yoke interconnecting the rods of each said pair of valves and engaged by the respective rocker means.

4. An engine in combination according to claim 3 in which said air supply passage means is bounded on the bottom by said crankcase and at the sides by said rows of cylinders, and a closure member closing the top of said passage means, said closure member including aperture means for the supply of air thereto and individual passage portions leading to the respective cylinders of said rows.

\* \* \* \* \*